United States Patent
Balakrishnan et al.

(10) Patent No.: US 7,035,240 B1
(45) Date of Patent: Apr. 25, 2006

(54) METHOD FOR LOW-ENERGY ADAPTIVE CLUSTERING HIERARCHY

(75) Inventors: Hari Balakrishnan, Winchester, MA (US); Anantha P. Chandrakasan, Belmont, MA (US); Wendi B. Heinzelman, Pittsford, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 920 days.

(21) Appl. No.: 09/749,332

(22) Filed: Dec. 27, 2000

(51) Int. Cl.
*H04Q 7/24* (2006.01)

(52) U.S. Cl. .................. 370/338; 370/328; 370/337; 709/224

(58) Field of Classification Search ................. 370/338
See application file for complete search history.

(56) References Cited

U.S. PATENT DOCUMENTS

| | | | |
|---|---|---|---|
| 5,515,509 A | | 5/1996 | Rom |
| 5,850,592 A | * | 12/1998 | Ramanathan .................. 455/7 |
| 5,946,317 A | * | 8/1999 | Parkhideh ................... 370/410 |
| 6,028,857 A | | 2/2000 | Poor |
| 6,304,556 B1 | * | 10/2001 | Haas ........................... 370/254 |
| 6,636,499 B1 | * | 10/2003 | Dowling ...................... 370/338 |
| 6,735,630 B1 | * | 5/2004 | Gelvin et al. ................ 709/224 |
| 6,831,904 B1 | * | 12/2004 | Yamao et al. ................ 370/331 |

FOREIGN PATENT DOCUMENTS

WO    WO 99/07113    2/1999

OTHER PUBLICATIONS

Wendi Rabiner Heinzelman et al., "Energy-Scalable Algorithms and Protocols For Wireless Microsensor Networks", Proc. International Conference on Acoustics, Speech, and Signal Processing (ICASSP '00), Jun. 20000, 4 pgs.

Prathima Agrawal et al., "Energy Conservation Design Techniques for Mobile Wireless VLSI Systems", IEEE Computer Society Workshop on VLSI, Apr. 1998, 34-39.

Teresa H. Meng et al., "Distributed Network Protocols for Wireless Communication", Proc. IEEEE ISCAS, May 1998,2 pgs.

Keith Scott et al., "The Self-Organizing Wireless Adaptive Network (SWAN) Protocol for Communication Among Mobile Users", Proceedings of the IEEE Globecom 1995, 3 pgs.

(Continued)

*Primary Examiner*—Seema S. Rao
*Assistant Examiner*—Michael J. Moore
(74) *Attorney, Agent, or Firm*—Daly, Crowley, Mofford & Durkee, LLP

(57) ABSTRACT

A method and network architecture for implementing an energy efficient network. The network includes a plurality of nodes that collect and transmit data that are ultimately routed to a base station. The network nodes form a set of clusters with a single node acting as a cluster-head. The cluster-head advertises for nodes to join its cluster, schedules the collection of data within a cluster, and then transmits the data to the base station. A cluster can intelligently combine data from individual nodes. After a period of operation, the clusters are reformed with a different set of nodes acting as cluster-heads. The network provides an increased system lifetime by balancing the energy use of individual nodes.

25 Claims, 10 Drawing Sheets

OTHER PUBLICATIONS

Michael J. Dong, et al., "Low Power Signal Processing Architectures for Network Microsensors", Proceedings 1997 International Symposium on Low Power Electronics and Design, Aug. 1997, pp. 173-177.

P. Agrawal et al., "An Adaptive Power Control and Coding Scheme for Mobile Radio Systems", Proc. IEEE International Conference on Personal Wireless Communications, Feb. 1996, pp. 283-288.

K. Bult et al., "Low Power Systems for Wireless Microsensors", 1996 International Symposium on Low Power Electronics and Design, Aug. 1996, pp. 17-21.

Dr. Larry Williams et al., "Near Term Digital Radio-A First Look", Proceedings of the 1996 Tactical Communications Conference, IEEE, Apr. 1996, pp. 423-425.

Russell Ruppe et al., "Near Term Digital Radio (NTDR) System", Proceedings MILCOM 1997, IEEE, Nov. 1997, pp. 1282-1287.

Suresh Singh et al., "Power-Aware Routing in Mobile Ad Hoc Networks", Proceedings of the Fourth Annual ACM/IEEE International Conference on Mobile Computing and Networking (MobiCom '98), Oct. 1998, pp. 181-190.

Bob Welsh et al., "Multicasting with the Near Term Digital Radio (NTDR) in the Tactical Internet", Proceedings MILCOM 1998, Oct. 1998, IEEE, pp. 452-456.

Deborah Estrin et al., "Next Century Challenges: Scalable Coordination in Sensor Networks", Proceedings of the Fifth Annual ACM/IEEE International Conference on Mobile Computing and Networking, MobiCom 1999, Aug. 1999, pp. 263-270.

Loren P. Clare et al., "Self-Organizing Distributed Sensor Networks", SPIE vol. 3713, Apr. 1999, pp. 229-237.

Wendi Rabiner Heinzelman et al., "Energy-Efficient Communication Protocol for Wireless Microsensor Networks", IEEE, Published in the Proceedings of the Hawaii International Conference on System Sciences, Jan. 4-7, 2000, pp. 1-10.

Wendi Beth Heinzelman, "Application-Specific Protocol Architectures for Wireless Networks", PhD Thesis, Submitted to the Dept. of Electrical Engineering and Computer Science for the degree of Doctor of Philosophy at the Massachusetts Institute of Technology, Jun. 2000, 1-154.

* cited by examiner

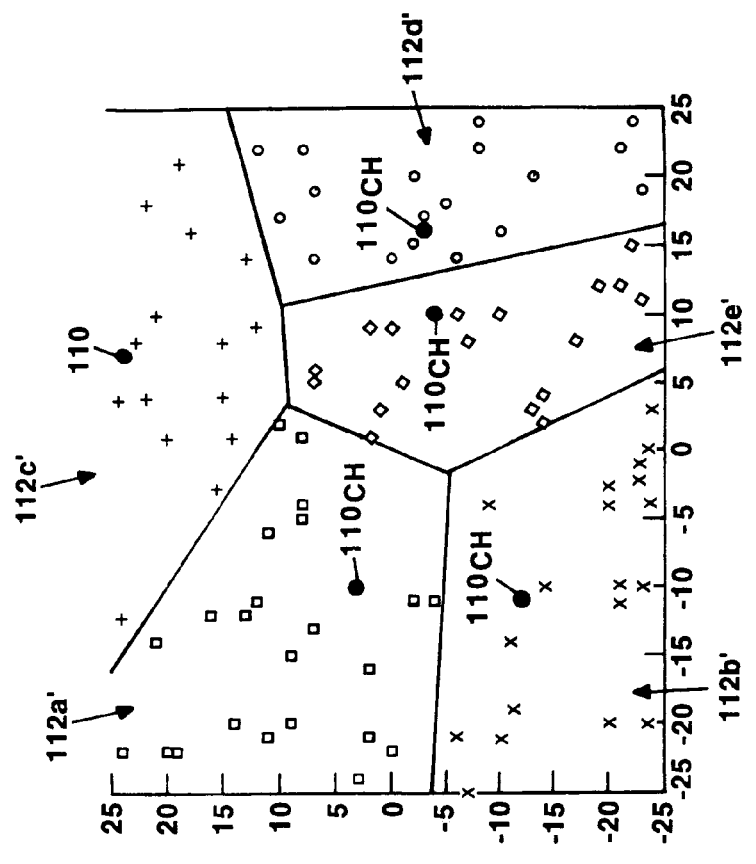
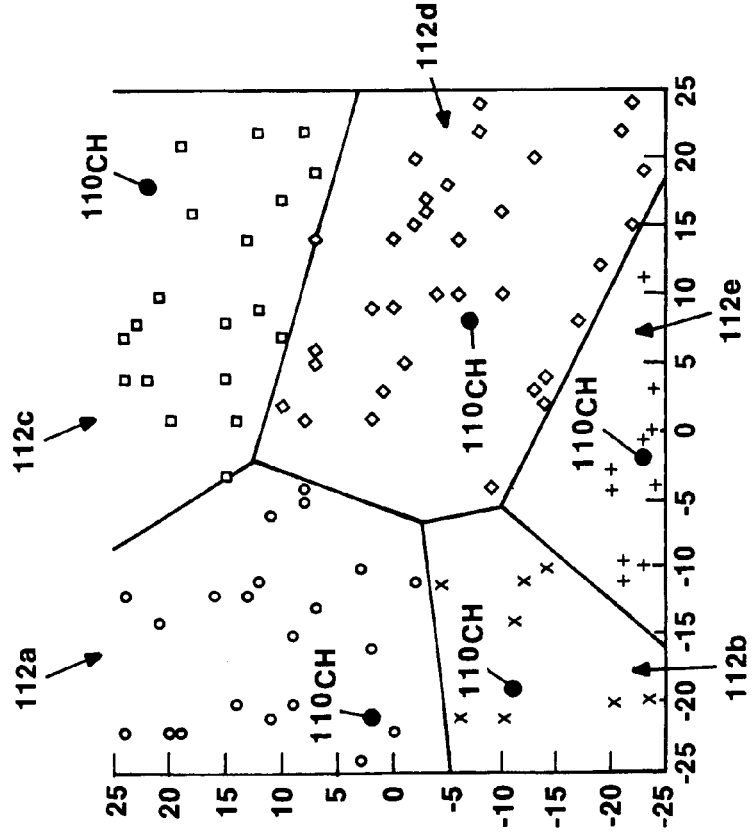

METHOD FOR LOW-ENERGY ADAPTIVE CLUSTERING HIERARCHY

STATEMENTS REGARDING FEDERALLY SPONSORED RESEARCH

This invention was made with government support under Contract No. DAAL01-96-2-0001 awarded by the U.S. Army and under Contract No. F30602-00-2-0551 awarded by the U.S. Air Force. The government has certain rights in the invention.

CROSS-REFERENCE TO RELATED APPLICATIONS

Not applicable.

FIELD OF THE INVENTION

The present invention relates to data communications networks. More specifically, the present invention relates to energy efficient wireless networks.

BACKGROUND OF THE INVENTION

As is known in the art, a distributed microsensor network is a network in which multiple, small, inexpensive, easy to handle sensors, interfaced with microprocessors, are deployed and distributed in a region for monitoring and control purposes. The microprocessors can transfer data collected by the sensors along with network control information among the microprocessors themselves or to a central base station via communication paths.

In some instances the microprocessors and attached sensors, collectively referred to as microsensor nodes or more simply nodes, are physically separated from each other but are coupled via a wireless network to provide a wireless distributed microsensor network. Using wireless communication between the nodes eliminates the need for a fixed communications infrastructure.

Each microsensor node includes a microprocessor, associated microsensor, power source and control, and a communications interface. The communications interface can be a radio frequency (RF) transmitter and receiver in wireless applications. In addition to the nodes themselves being relatively inexpensive, deployment of wireless microsensor node networks is relatively inexpensive compared with conventional networks which utilize relatively expensive macrosensors which are directly wired to a central controller.

These microsensor networks are fault-tolerant, due to the sheer number of nodes which can ensure that there is enough redundancy in data acquisition even if not all nodes are functional. A limitation on the fault-tolerant property is that connectivity between all remaining nodes and a central base station must be maintained when some nodes fail or run out of energy.

Such wireless distributed microsensor networks are used to monitor a variety of environments for both civil and military applications. For example, for a security system, acoustic, seismic, and video sensors can be used to form an ad hoc wireless network to detect intrusions. Microsensors can also be used to monitor machines for fault detection and diagnosis.

Communication protocols, in such wireless distributed networks can have significant impact on the overall energy dissipation of these networks. Ideally, network protocols provide fault tolerance in the presence of individual node failure while minimizing energy consumption.

Eventually, the data being sensed by the nodes in the network must be transmitted to the central base station, where the end-user can access the data. One problem with wireless microsensor node networks, however, is that channel bandwidth is a limited network resource which must be shared among all the sensors in the network. Thus, it is desirable to provide routing protocols for these networks which reduce bandwidth requirements for data transmission.

There are many possible models for wireless microsensor node networks. For example, some microsensor networks include a fixed base station and distributed sensors located relatively far from the base station. Generally increased distance from the base station requires increased RF energy to be expended by a node to communicate with the base station. In such networks, the nodes in the network typically are homogeneous and energy-constrained. One problem with homogeneous and energy constrained networks is that communication between the sensor nodes and the base station is relatively expensive in terms of energy consumption.

To overcome this problem, some systems focus on energy-optimized solutions at all levels of the network hierarchy, from the physical layer and communication protocols up to the application layer and efficient DSP design for microsensor nodes. These approaches, however, are sometimes relatively expensive and complex to implement.

There have been several network routing protocols proposed for wireless networks. In one approach referred to as a direct communication protocol approach, each sensor sends its data directly to the base station. One problem with this approach, however, is that if the base station is far away from the nodes, direct communication between the base station and the nodes requires a relatively large amount of transmit power from each node. The need for a relatively large amount of transmit power quickly drains the node battery and thereby reduces the system lifetime. Another problem with direct communication protocol approaches is that sensor networks contain too much data for transmission. Also, the sensor networks contain more data than can be efficiently processed by an end-user. Therefore, automated methods of combining or aggregating the data into a small set of meaningful information is required.

A second approach is a so-called "minimum-energy" routing protocol. In networks using minimum-energy protocols, nodes route data destined ultimately for the base station through intermediate nodes. Thus, nodes act as routers for other nodes' data in addition to sensing the environment and transmitting locally collected data.

One problem with this approach is that the router nodes can quickly run out of power. There are some minimum energy protocols which only consider the energy of the transmitter and neglect the energy dissipation of the receivers in determining the routes. In such protocols, the intermediate nodes are chosen such that the transmit amplifier energy (thus node energy) is minimized. However, for this minimum-transmission-energy (MTE) routing protocol, rather than just one (relatively high-energy) transmission of the data, each data message must go through n (low-energy) transmissions and n receptions. Thus, depending on the relative costs of the transmit amplifier and the radio electronics, the total energy expended in the network might actually be greater using MTE routing than direct transmission to the base station.

In MTE routing, the nodes closest to the base station are used to route a large number of data messages to the base station. Thus these nodes will die out quickly, causing the energy required to get the remaining data to the base station to increase and more nodes to die. This will create a cascading effect that will shorten system lifetime. In addition, as nodes close to the base station die, that area of the environment is no longer being monitored. Conventional approaches to routing such as MTE contain these drawbacks when the nodes are all energy-constrained.

When transmission energy is on the same order as reception energy, which occurs when transmission distance is short and/or the radio electronics energy is high, direct transmission is more energy-efficient on a global scale than MTE routing. Thus the most energy-efficient protocol to use in any particular application depends upon the network topology and radio parameters of the network.

It would, therefore, be desirable to provide a network communication protocol that minimizes energy dissipation in sensor networks. It would also be desirable to evenly distribute the energy load among the sensor nodes in the network. It would further be desirable to reduce the amount of information that must be transmitted to the base station and increase the use of the communications bandwidth. It would be still further desirable to provide a wireless network having many microsensor nodes and a prolonged system life when the nodes are energy-constrained.

SUMMARY OF THE INVENTION

In view of the above problems and limitations of existing distributed sensor networks and protocols and in accordance with the present invention, the importance of balancing the node energy load, and reducing the data transmitted when the nodes are energy-constrained has been recognized. It would therefore be desirable to provide a network having a clustering-based protocol which utilizes randomized rotation of local cluster-heads, localized coordination to enable scalability and robustness for dynamic networks, and the incorporation of data fusion into the routing protocol to reduce the amount of information that must be transmitted to a base station.

In accordance with an aspect of the present invention, a network includes a base station and a plurality of nodes. Each of the nodes has a low energy mode, and a high energy mode and are organized into node clusters. Each node cluster includes a designated cluster-head. Each of the nodes in the cluster collects information and transmits the information to the cluster-head. The cluster-head then transmits the information collected by the nodes in the cluster to the base station. The network further comprises means for selecting a new cluster-head and means for forming new clusters about the new cluster-heads. With such an arrangement, the network achieves energy-efficiency by (i) randomized, adaptive, self-configuring cluster formation, (ii) localized control for data transfers, and (iii) low-energy medium access. By providing for the selection of new cluster-heads, the energy load is balanced in order to prolong the overall system life. Moreover, all the nodes in the network can share the limited channel bandwidth by using local low energy transmissions separated spatially from one another in order to avoid interference. The nodes can also enter a sleep mode to preserve energy. The nodes can additionally include attached microsensors or control interfaces.

In accordance with a further aspect of the present invention a method of forming a network from a plurality of nodes includes the steps of (a) forming the nodes into a plurality of clusters for a round of data transmission, each of the plurality of clusters containing a cluster-head; (b) operating the cluster to transfer data; (c) selecting new cluster-heads; and (d) repeating steps (a)–(c) for a subsequent round of data transmission. With such an implementation, an energy efficient protocol is provided. The cluster-heads schedule data transfers to minimize collisions and maximize sleep time of the other nodes in the cluster, thereby reducing energy dissipation. Furthermore, the cluster formation is self configuring and fault tolerant.

In accordance with a still further aspect of the present invention a method of cluster operation includes the steps of collecting data in a cluster-head and reducing the data transmission latency by using application-specific data aggregation to reduce the amount of redundant data transmitted from the cluster-head to a base station. Local data aggregation at the cluster-heads greatly reduces the amount of data that needs to be sent to the base station. An application-specific protocol architecture achieves the energy- and latency-efficiency needed for wireless microsensor networks. In addition to helping avoid information overload, data aggregation, also known as data fusion, can combine several unreliable correlated data measurements to produce a more accurate signal by enhancing common signals and reducing uncorrelated noise. Since the method is application specific and can achieve a greater level of redundant data reduction, the method is energy- and latency-efficient. Thus, application-specific data aggregation can also increase the signal to noise ratio of the data sent to the base station. The classification or higher level processing of aggregated data can be performed manually (e.g., with the aid of a human operator) or automatically. In one embodiment, the method of performing data aggregation and the classification algorithm are application-specific. For example, acoustic signals are often combined using a beam-forming algorithm to reduce several signals into a single signal that contains the relevant information of all the individual signals. Large energy gains can be achieved by performing the data fusion or classification algorithm locally, thereby requiring much less data to be transmitted to the base station.

The benefits of the present techniques and network topology include localized coordination and control for cluster setup and operation, randomized rotation of the cluster-heads and formation of the corresponding clusters, and local data aggregation to reduce global communication. The use of clusters for transmitting data to the base station leverages the advantages of short transmit distances for most nodes, requiring only a few nodes to transmit over far distances to the base station. The Low-Energy Adaptive Clustering Hierarchy (LEACH) technique of the present invention outperforms classical clustering algorithms by allowing the energy requirements of the network to be distributed among all the sensors. In addition, LEACH is able to perform local computation in each cluster to reduce the amount of data that must be transmitted to the base station. This achieves a large reduction in the energy dissipation, because computation is much less expensive than RF communication.

In accordance with a still further aspect of the present invention, it is possible to form the clusters by collecting data on the status of each of the plurality of nodes and assigning each of the plurality of nodes to a particular cluster. With such an alternative cluster formation method, the base station can form clusters, which will generally be more efficient than those formed using a distributed algorithm as described above. However, the improved cluster formation is at the expense of requiring that each node transmit information to the base station at the beginning of each round about its location.

Although the inventive teachings are disclosed with respect to wireless network applications, the present teachings may be used for other applications (e.g., non-wireless networks) as will be appreciated by those skilled in the art. Likewise, the type of sensor associated with the microprocessor is not limited to an acoustic or seismic sensor but could be an image sensor or any sensor as is know in the art which can be controlled by a microprocessor. Additionally the microprocessors in the inventive network could operate as a node with or without a sensor and could include a control module for operating external devices.

BRIEF DESCRIPTION OF THE DRAWINGS

The foregoing features of this invention, as well as the invention itself, may be more fully understood from the following description of the drawings in which:

FIG. 5A is a diagram of the result of dynamic cluster formation prior to a round of operation of the low-energy adaptive clustering hierarchy according to the present invention;

FIG. 5B is a diagram of the result of dynamic cluster formation in a round of operation subsequent to the round shown in FIG. 5A of the low-energy adaptive clustering hierarchy according to the present invention;

DETAILED DESCRIPTION OF THE INVENTION

Before describing the system, some concepts are identified and terminology is explained. As used herein, the term "network" or "system" refers to a plurality of nodes which communicate with each other and with one node which may be designated as a "base station".

In an effort to promote clarity in the text, reference is sometimes made herein to a particular type of network (e.g., a wireless network) or a particular network configuration. Such reference should not be taken as limiting the invention to a particular type of network or to a specific network configuration. The present invention finds application in any network in which the nodes are energy constrained.

Reference is also made herein to certain ones of the network nodes being part of a "cluster". Each cluster is made of one node corresponding to a cluster-head and may contain additional nodes corresponding to non-cluster-head nodes. Each of the cluster-heads and non-cluster heads perform certain functions to be described below. Those of ordinary skill in the art should appreciate, however, that during the operation of a network organized using the inventive hierarchy, a node can at any given time be a cluster-head in one cluster and can be a non-cluster-head node in a different cluster at a subsequent point in time. It should thus be appreciated that references made hereinbelow to a particular node corresponding to a cluster-head are made only for ease of explanation and, in accordance with the invention, any node can be either a cluster-head or a non-cluster head. Furthermore, any non-cluster head can elect itself to be a cluster head.

It should also be understood that in some of the examples given below the nodes are identical or homogenous but that this need not be so. The adaptive cluster formation technique of the present invention, including the random selection of cluster-heads, can be used regardless of whether the nodes are homogenous. Furthermore, the techniques of the present invention are not affected by an unequal node energy distribution which can occur in some applications. The nodes described below are not required to be either fixed or mobile. Likewise, as mentioned above, the present invention finds application in a wide variety of different network configurations and applications including but not limited to environmental monitoring, communications networks, image capture and seismic monitoring networks.

Figure 1A:
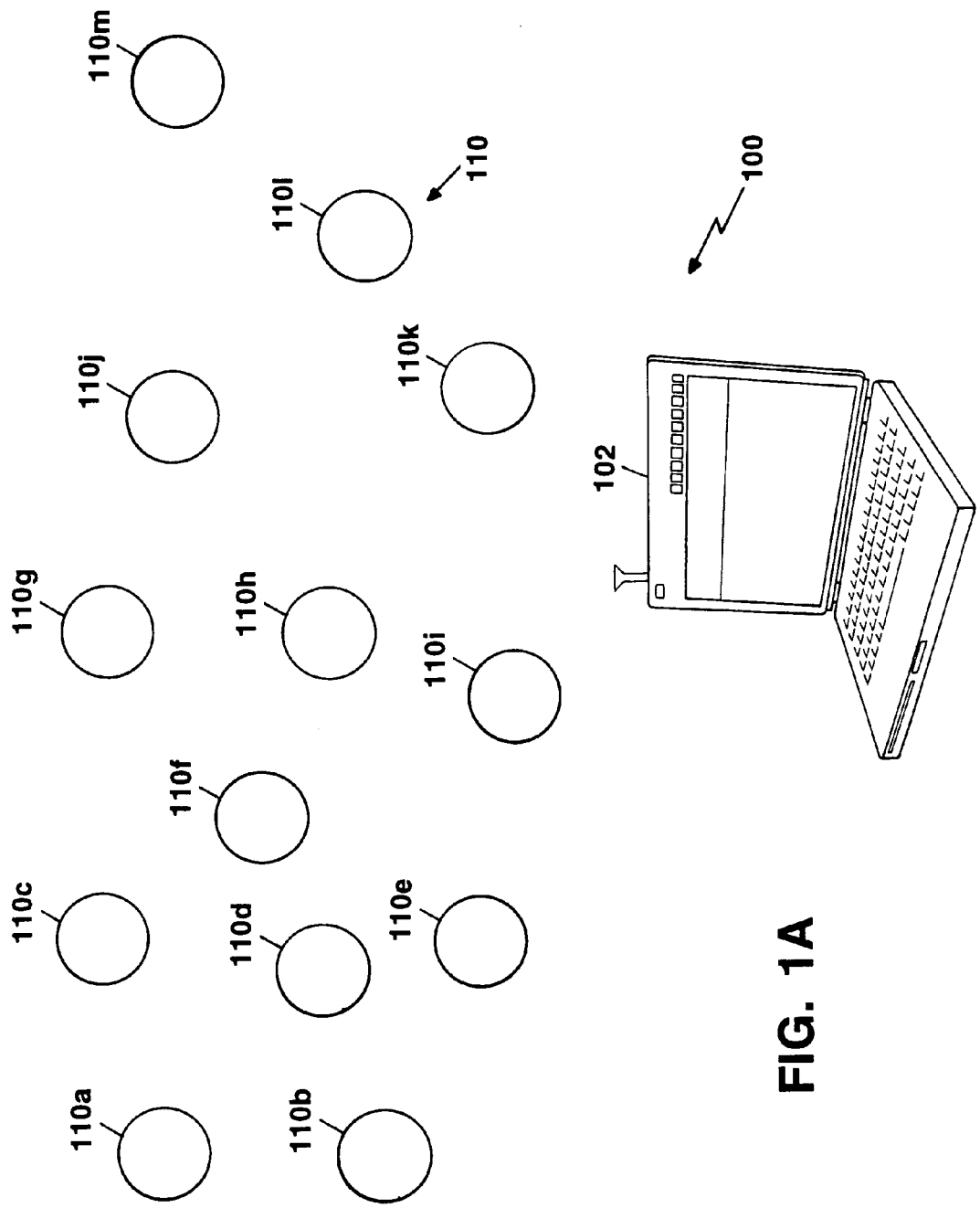
FIG. 1A is a block diagram representing a network having nodes and a base station.

Referring now to FIG. 1A, a network 100 includes a base station 102, and a plurality of nodes 110a–110m generally denoted 110. All of the nodes 110 may have the capability to communicate with the base station 102.

Figure 1B:
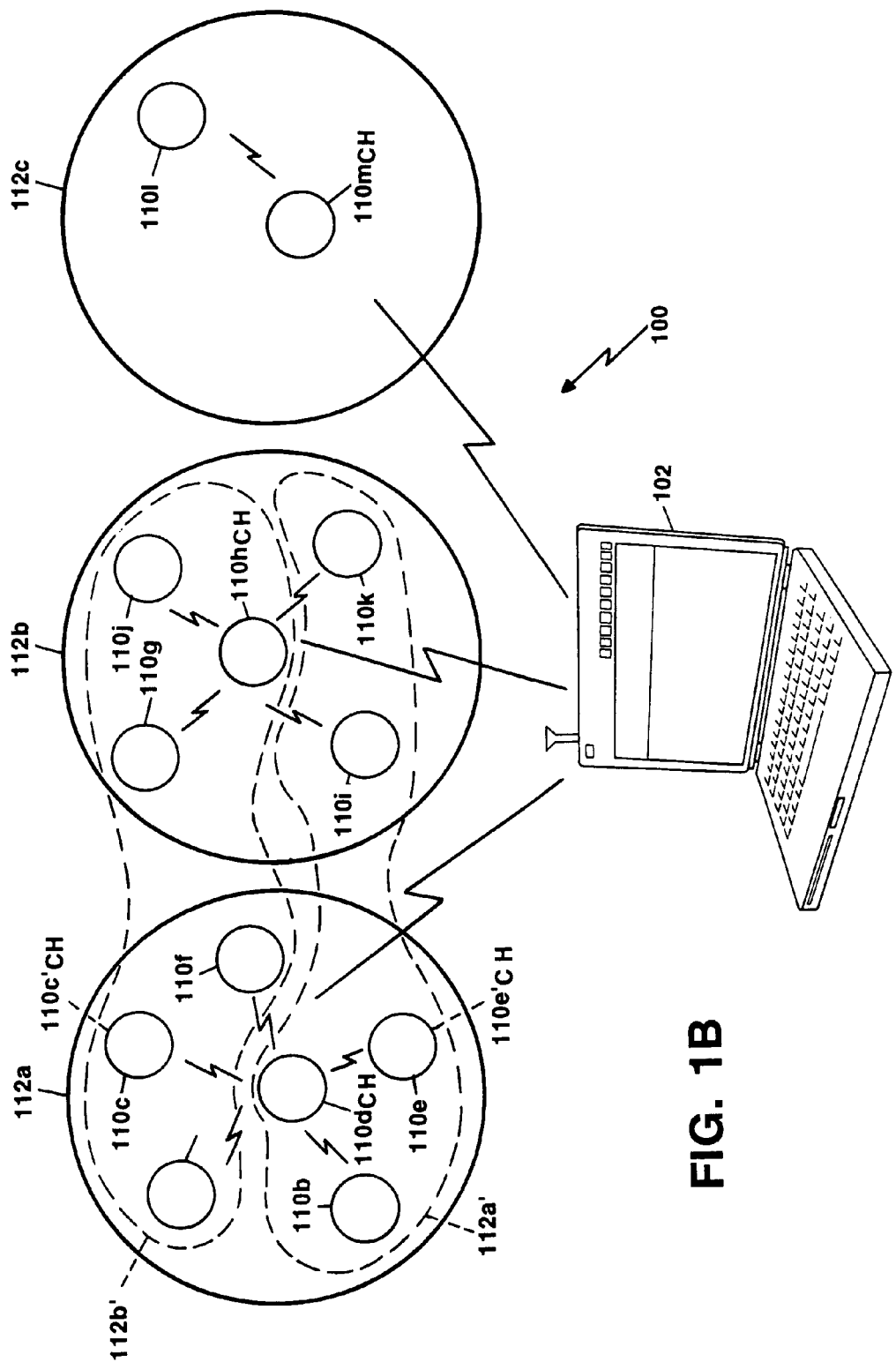
FIG. 1B is a block diagram representing a network having nodes organized into clusters with cluster-heads communicating with a base station according to the present invention.

Referring now to FIG. 1B, in which like elements of FIG. 1A are provided having like reference designations. Once the nodes 110 are deployed in their environment, the nodes are organized into a plurality of individual clusters 112a–112k, generally denoted 112. The number of clusters 112 generally expected for any particular application is preferably a configuration parameter.

The base station 102 can communicate with the plurality of clusters 112. Taking cluster 112a as representative of clusters 112, cluster 112a is made up of nodes 110a–110f. Node 110d corresponds to a cluster-head and is denoted $110d_{ch}$. The base station 102, communicates with cluster 112a via transmissions to and from cluster-head $110d_{ch}$. The cluster 112a thus includes a plurality of non-cluster-head nodes 110a–110c, 110e and 110f and cluster-head $110d_{ch}$.

The network 100 of the present invention implements a Low-Energy Adaptive Clustering Hierarchy (LEACH) protocol. LEACH is an application-specific protocol architecture for wireless microsensor network 10 which provides randomized, adaptive, self-configuring cluster formation; localized control for data transfers; low-energy medium access; and application-specific data aggregation to reduce the amount of data sent to the user. A clustering protocol has several advantages in terms of energy- and bandwidth-efficiency. During cluster formation, the nodes 110 organize themselves into local clusters 112a–112c generally denoted 112 and a subset of the nodes 110 act as so-called cluster-heads. In FIG. 1B, nodes 110d, 110h and 110m correspond to the cluster-heads, generally denoted $110_{chs}$. Using a clustering approach, all non-cluster-head nodes, generally denoted $110_{Non-chs}$, in clusters 112a–112k only need to transmit their data a short distance, i.e., to the respective cluster-heads $110d_{ch}$, $110h_{ch}$ and $110m_{ch}$. Furthermore, only the cluster-heads $110d_{ch}$, $110h_{ch}$ and $110m_{ch}$ need to receive data, which is an energy-intensive operation. Clustering can therefore reduce energy consumption for most of the nodes 110 in the network.

In addition, the cluster-head $110d_{ch}$ can coordinate the transmissions of the nodes 110a–110c, 110e and 110f in the cluster 112a. This reduces the number of times two transmissions interfere with each other (a collision) and also reduces the amount of time nodes 110a-110c, 110e and 110f need to be awake to transmit data.

Furthermore, clusters 112a–112k can automatically facilitate spatial reuse of the bandwidth by reducing transmission energy so that nodes 110 having sufficient spatial separation can use the same transmission frequencies because these separate low-energy transmissions will not interfere with each other. Finally, if the data collected by nodes 110 within each cluster 112a–112k are correlated, the cluster-heads $110d_{ch}$, $110h_{ch}$ and $110m_{ch}$ can perform local data aggregation within each cluster 112a–112k as will be explained below.

If the cluster-heads $110_{chs}$ were chosen a priori and fixed throughout the system lifetime, as in conventional clustering algorithms, the cluster-heads $110_{chs}$ would die quickly, ending the useful lifetime of all nodes 110 belonging to clusters 112a–112c because there would be no way to communicate with the base station 102.

In accordance with the present invention, however, any node 110 in the network 100 can serve as a cluster-head at some point in time. In one embodiment, a randomized rotation of the high-energy cluster-heads $110_{chs}$ is used such that functions provided by the cluster-head rotate amongst the nodes 110 in order to avoid draining the power source of any one node 110 in the network 100.

One particular technique for selecting cluster-heads and forming clusters is described below in conjunction with FIGS. 3–8C. In general, once the nodes 110 are deployed in the environment of interest, certain ones of the nodes elect themselves as cluster-heads. In the example of FIG. 1A, nodes 110d, 110h and 110m have elected themselves as cluster-heads. Next, the remaining nodes, (i.e., the non-cluster-head nodes $110_{Non-chs}$) 110a–110c, 110e–110g, 110i–110j determine which cluster-head they will communicate with. The clusters 112a, 112b and 112c are formed once each non-cluster-head nodes $110_{Non-chs}$ selects a cluster-head $110_{ch}$ with which to communicate.

Cluster 112a', including nodes 110b, 110d, 110e, 110i and 110k with node $110e'_{ch}$ operating as the cluster head, represents a cluster formed subsequent to initial cluster formation. In cluster 112a', node 110d is no longer operating as the cluster head $110_{ch}$. Likewise, cluster 112b', including nodes 110a, 110c, 110f, 110g, and 110h and 110j with node $110c'_{ch}$ operating as the cluster head is a subsequently formed cluster 112.

Figure 2:
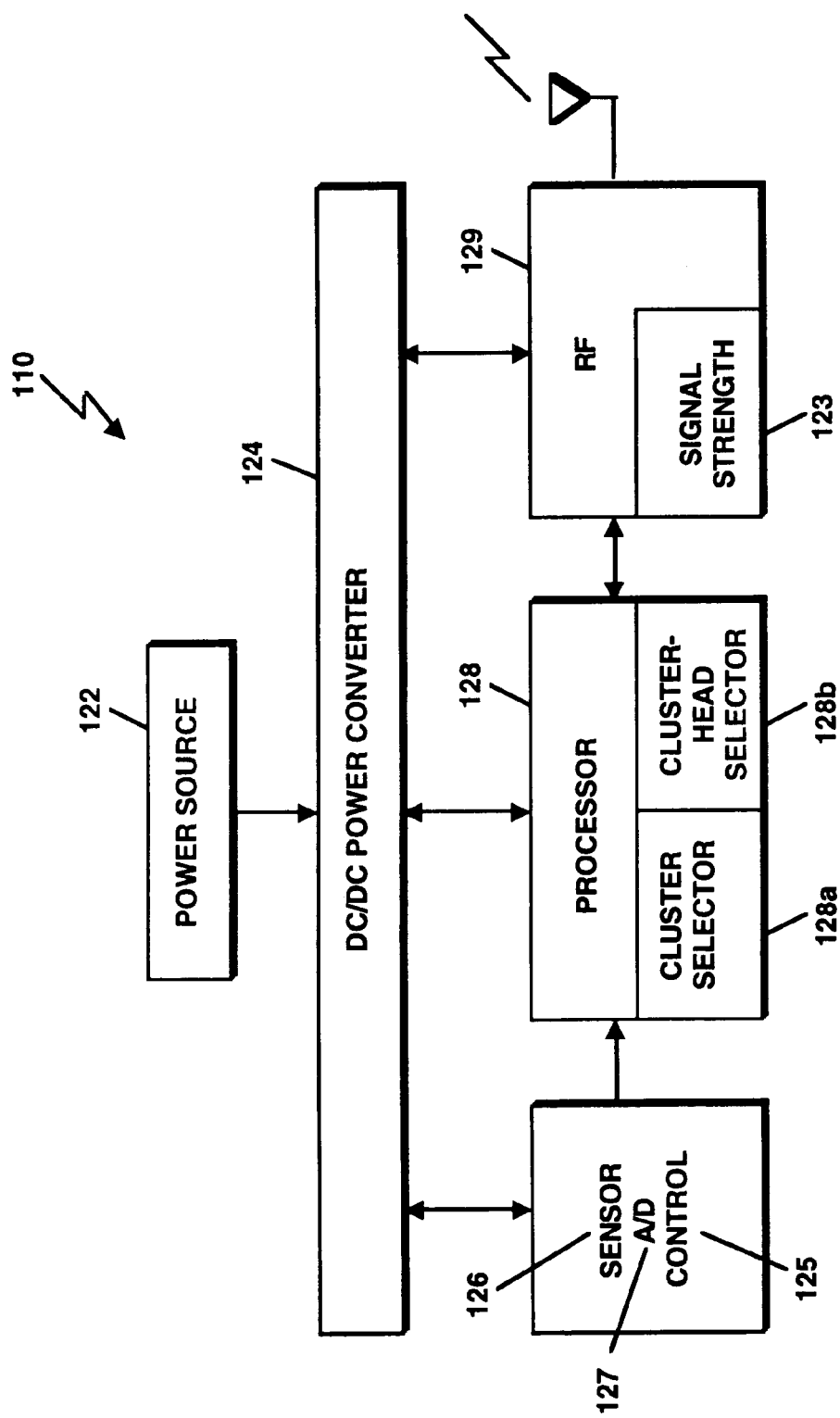
FIG. 2 is a block diagram representing a typical wireless node.

One possible node 110 architecture is shown in FIG. 2. It should be appreciated that nodes 110 can use commercially available components. In this particular example, a node 110 includes a microprocessor 128 such as a StrongARM (SA-1100) microprocessor running a lean version of the RedHat eCos operating system for implementation of digital signal processing (DSP) algorithms, powered from a DC/DC Power Converter 124 connected to a power source 122. The power source 122 can be provided, for example, as a battery. It should be appreciated that other power sources such as solar power or self-powered sources (e.g. power derived from machine vibrations) can power the nodes 110.

The microprocessor 128 controls a sensor 126, an analog to digital converter (A/D) 127 and an RF transceiver module 129. The RF transceiver module 129 includes a signal strength processor 123. The node can contain a control unit 125 for controlling external devices. The use of the microprocessor 128 allows rapid, easy programming of the nodes 110 to execute protocols and enables monitoring of the energy dissipation required for the various functions performed within the protocol. The microprocessor 128 can also place the nodes 110 into a high energy, a low energy or a sleep state. The RF transceiver module 129 dissipates approximately 50 nJ/bit to 1000 nJ/bit to run the transmitter or receiver circuitry. Low energy radios are described in an article entitled "Energy-Efficient Communication Protocol for Wireless Microsensor Networks," W. Rabiner Heinzelman, A. Chandrakasan, and H. Balakrishnan, *Proceedings of the 33$^{rd}$ International Conference on System Sciences* (HICSS '00), January 2000.

The signal strength processor 123 is used in the cluster 112 formation process to determine the cluster-head $110_{ch}$ that requires the minimum communication energy for the non-cluster-head node $110_{Non-ch}$. It should be appreciated that other indirect means for determining communication energy, for example, a global positioning system (GPS) which can determine inter-nodal distances, can be used in the cluster 112 formation process. One of ordinary skill in the art would recognize that various types of sensors 126 and control interfaces including digital input and output modules, and digital to analog converters (DACs) could be interfaced to microprocessor and that a node could have a range of power requirements.

The node 110 also includes a cluster-head selector processor 128b and a cluster selector processor 128a. The detailed operations of cluster-head selector processor 128b and cluster selector processor 128a will be described below in conjunction with FIG. 4. Suffice it here to say that cluster-head selector processor 128b determines when the node will elect or designate itself as a cluster-head and that cluster selector processor 128a determines the cluster-head with which the node will communicate once it is determined that the node is a non-cluster-head node $110_{Non-ch}$. The cluster and cluster-head selection processors may be implemented as individual circuits or processors or may be provided as part of microprocessor 128 (i.e., microprocessor 128 would perform the functions of the cluster and cluster-head selection circuits). The blocks denoted "processors" can represent computer software instructions or groups of instructions. Alternatively, the processing blocks represent steps performed by functionally equivalent circuits such as a digital signal processor circuit or an application specific integrated circuit (ASIC).

It should be appreciated that since the functions performed by the cluster-head are swapped or rotated amongst each of the nodes 100, then the cluster and cluster-head selector processor 128b in each node must periodically operate to determine whether they should become a cluster-head and if not, to determine which cluster they should join.

Figure 3:
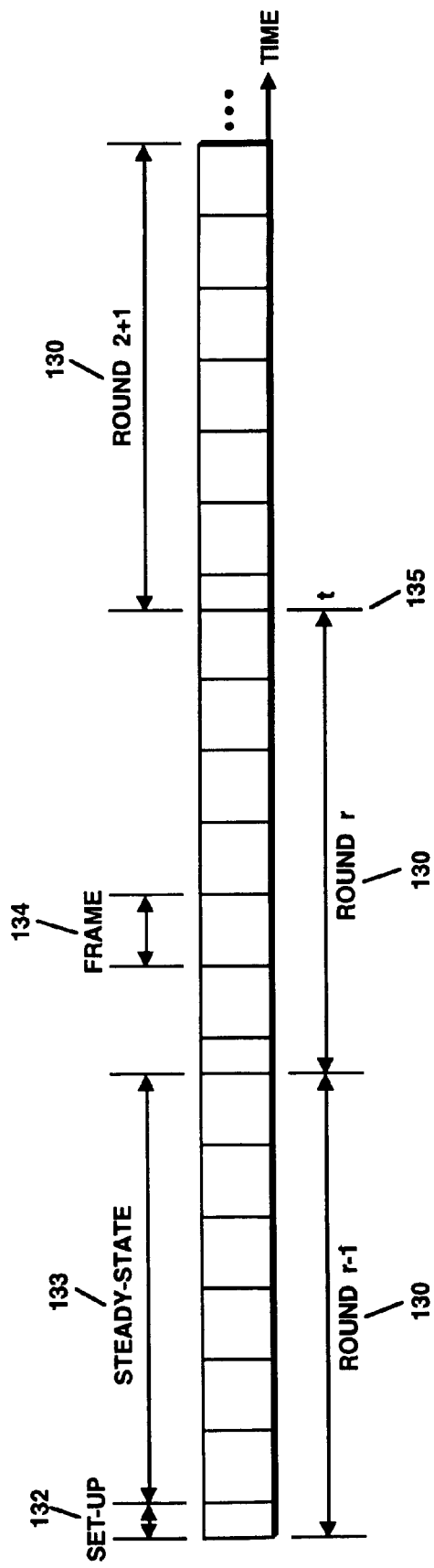
FIG. 3 is a timing diagram of setup and steady state operation according to the present invention.

In operation, the system communication over time is divided by the protocol into rounds 130 as shown in FIG. 3. Each round 130 begins with a set-up phase 132 when the clusters 100 are formed, followed by a steady-state phase 133 in which several frames 134 of data are transferred from the non-cluster-head nodes $110_{Non-chs}$ to the respective cluster-heads $110a_{ch}$ and on to the base station 102. In order to minimize overhead, the steady-state phase 133 is long compared to the set-up phase 132. Using cluster 112a as an example, in each frame 134, each node 110a–110c, 110e and 110f is assigned a time slot to transmit data collected from each associated sensor 126 (as shown in FIG. 2) to the cluster-head $110d_{ch}$. The nodes 110 must all be time-synchronized in order to start the set-up phase 132 at the same time. The nodes 110 are preferably synchronized by the base station 102 transmitting synchronizing signals to the cluster-heads $110_{chs}$ which in turn synchronize the non-cluster-head nodes $110_{Non-chs}$. It should be appreciated that other methods can be used to synchronize the nodes 110 such as a signal from a global time source. Thus, each cluster 112a–112c begins each round 130 at the same time.

Routing and medium access in the system are preferably selected to minimize energy and latency by exploiting application-specific information. High-energy data transfers in the system 100 are scheduled during each round 130 by the then designated cluster-heads $110d_{ch}$, $110h_{ch}$ and $110m_{ch}$ to ensure no collisions in the data transmissions and to allow non-cluster-head nodes $110_{Non-chs}$ to remain in the sleep state as long as possible. The medium access during all phases of the system is preferably selected to minimize collisions and maximize sleep time. Including a sleep state is one method to lower the medium access energy requirements. Additionally adjustable power levels and other techniques known in the art can be used to conserve energy during operation.

The system 100 also facilitates local processing of the data at each of the cluster-heads $110_{chs}$. Data aggregation techniques can be used to reduce the amount of data that needs to be transmitted from each of the cluster-heads $110_{chs}$ to the base station 102, greatly minimizing the energy dissipated in the cluster-heads $110_{chs}$.

In a preferred embodiment, the system forms clusters 112a–112c by using a distributed algorithm, where nodes 110 make autonomous decisions without any centralized control. The advantages of this approach are that no long-distance communication with the base station 102 is required and distributed cluster formation can be accomplished without knowing the exact location of any of the nodes 110 in the network 100. In addition, no global communication among the nodes 110 is necessary to set up the clusters 112. Rather, clusters 112 are formed out of the nodes 110, purely via local decisions made autonomously by each node 110. Starting after an initial round 130 of operation denoted round r, some of the nodes 110 elect themselves to be cluster-heads $110_{ch}$ at the beginning of round 130 (r+1) (which starts at time t, denoted by reference number 135) with a certain probability, $P_i(t)$. This probability is chosen such that the expected number, E, of cluster-heads $110_{chs}$ for this round 130 is k, a network parameter. Thus:

$$E[\# CH] = \sum_{i=1}^{N} P_i(t)^*1 = k \quad \text{(Equation 1)}$$

where N is the total number of nodes 110 in the network. The parameter K is the average number of clusters and is preferably a parameter set by the system administrator when the network 100 is configured. In another embodiment the parameter K could be changed dynamically by the base station 102 or calculated automatically. The calculation of the optimum number of clusters is described in "Application-Specific Protocol Architectures for Wireless Networks," W. Heinzelman, PhD Thesis, Massachusetts Institute of Technology, June 2000.

In order to maximize system lifetime, all nodes 110 preferably dissipate an equal amount of energy. This requires an approach, in which, no individual node 110 is being overly utilized compared to the other nodes 110. Because being a cluster-head is significantly more energy-intensive than being a non-cluster-head node $110_{Non-ch}$, this requirement translates to having the nodes 110 be cluster-heads $110_{chs}$ the same number of times, assuming all nodes 10 begin with approximately the same amount of energy. If k nodes 110 are cluster-heads $110_{chs}$ during each round 130, each node 110 should be a cluster-head $110_{ch}$ once in N/k rounds. Combining these constraints, provides the following probability for each node 110 (node i) to be a cluster-head $110_{ch}$ at time t:

$$P_i(t) = \begin{cases} \dfrac{k}{N - k^*(r \bmod N/k)} & C_i(t) = 1 \\ 0 & C_i(t) = 0 \end{cases} \quad \text{(Equation 2)}$$

where r is the number of rounds 130 that have been completed and $C_i(t)=0$ if node i 110 has already been a cluster-head 110 in the most recent (r mod N/k) rounds and 1 otherwise. Therefore, only nodes 110 that have not already been cluster-heads $110_{ch}$, and hence have more energy available than nodes 110 that have performed this energy-intensive function, may become cluster-heads $110_{chs}$ at round 130 r+1. There will be approximately (N–k)*r nodes 110 that have not been cluster-heads $110_{chs}$ in the first r rounds 130. After all nodes 110 have been cluster-heads $110_{chs}$ (which occurs in N/k rounds), all nodes 110 are again eligible to become cluster-heads $110_{chs}$. Therefore, the term N–k*(r mod N/k) represents the total number of nodes 110 that are eligible to be a cluster-head $110_{ch}$ during round 130 (r+1), and $$\sum_{i=1}^{N} C_i(t) = N - k^*(r \bmod N/k) \quad \text{(Equation 3)}$$

This ensures that the energy at each node 110 is approximately equal after every N/k rounds 130. Using Equations (2) and (3), the expected number of cluster-heads $110_{chs}$ per round 130 is:

$$\begin{aligned} E[\# CH] &= \sum_{i=1}^{N} P_i(t)^*1 \\ &= (N - k^*(r \bmod N/k))^* k / (N - k^*(r \bmod N/k)) \\ &= k \end{aligned} \quad \text{(Equation 4)}$$

This choice of probability for becoming a cluster-head $110_{ch}$ assumes that all nodes 110 begin with an equal amount of energy. If each node 110 begins with different amounts of energy, the nodes 110 with more energy will be cluster-heads $110_{chs}$ more often than the nodes 110 with less energy, in order to ensure that all nodes 110 die at approximately the same time. In this case, the probability of becoming a cluster-head $110_{ch}$ depends on a node's 110 energy level relative to the aggregate energy remaining in the network 10, rather than purely the number of times the node 110 has been a cluster-head $110_{ch}$:

$$P_i(t) = (E_i(t)/E_{total}(t))^* k \quad \text{(Equation 5)}$$

where $E_i(t)$ is the current energy of node i, and $$E_{total}(t) = \sum_{i=1}^{N} E_i(t) \quad \text{(Equation 6)}$$

Using these probabilities, the nodes 110 with higher energy are more likely to become cluster-heads $110_{ch}$ than nodes 110 with less energy. The expected number of cluster-heads $110_{chs}$ is:

$$E[\# CH] = \sum_{i=1}^{N} P_i(t) * 1 \quad \text{(Equation 7)}$$
$$= (E_1(t)/E_{total} + \ldots + E_N(t)/E_{total})k$$
$$= k$$

Equation 5 can be approximated by Equation 2 when the nodes 110 begin with equal energy, $E_o$. If a node 110 has been a cluster-head $110A_{ch}$ in the last r<N/k rounds 130, its energy is approximately $E_o-E_{CH}$, where $E_{CH}$ is a large number less than $E_o$. If the node has not been a cluster-head $110 A_{ch}$ in the last r rounds 130, its energy is approximately $E_o$, since being a non-cluster-head node $110_{Non-ch}$ does not require much energy from the node 110. Since k*r nodes 110 have been cluster-heads $110_{chs}$ and (N−k)*r nodes 110 have not been cluster-heads $110_{chs}$ in the last r rounds 130, the total energy is given by:

$$E_{total} = E_o(N-kr) + (E_o-E_{CH})(kr) \quad \text{(Equation 8)}$$

Therefore, Equation 5 becomes:

$$P_i(t) = \begin{cases} \dfrac{E_o k}{E_o(N-kr)+(E_o-E_{CH})kr} & C_i(t) = 1 \\ \dfrac{(E_o-E_{CH})k}{E_o(N-kr)+(E_o-E_{CH})kr} & C_i(t) = 0 \end{cases} \quad \text{(Equation 9)}$$

Since $E_o >> (E_o-E_{CH})$, this can be simplified to:

$$P_i(t) \approx \begin{cases} \dfrac{k}{N-kr} & C_i(t) = 1 \\ 0 & C_i(t) = 0 \end{cases} \quad \text{(Equation 10)}$$

This is exactly the same equation as Equation 2 (for r<N/k). Using the probabilities in Equation 5 requires that each node 110 have an estimate of the total energy of all the nodes 110 in the network, and hence requires a routing protocol that allows this to be computed, whereas the probabilities in Equation 2 enable each node 110 to make completely autonomous decisions. An alternate approach to avoid the routing protocol might be to approximate the aggregate network energy by averaging the energy of the nodes 110 in each cluster 100 and multiplying by N.

Figure 4:
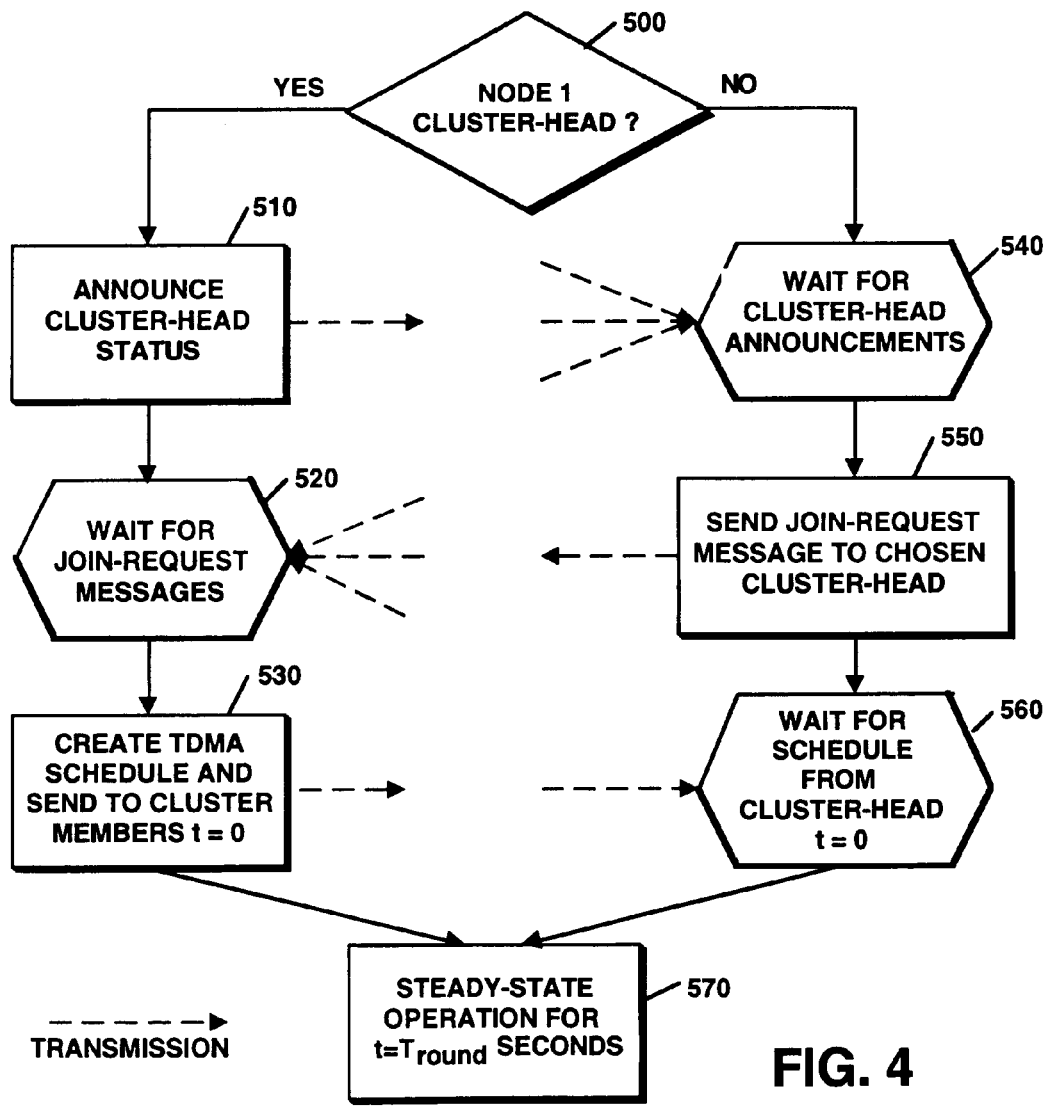
FIG. 4 is a flow diagram of a method of forming a distributed cluster according to the present invention.

With reference to FIG. 4, at step 500, nodes 110 determine if they have elected themselves to be local cluster-heads $110_{chs}$ at any given time with a certain probability as given in Equations 2 and 5. At step 510, these cluster-heads $110_{chs}$ broadcast their status to the other nodes 110 in the network. At step 550, each node 110 chooses the cluster-head $110_{ch}$ with which it wants to communicate.

In a preferred embodiment, each non-cluster-head node $110_{Non-ch}$ measures the signal strength of the cluster-head status announcements transmitted by the cluster-heads $110_{chs}$. Each non-cluster-head node $110_{Non-ch}$ compares the signal strengths of received status messages and selects the cluster-head $110_{ch}$ that requires the minimum communication energy for the non-cluster-head node $110_{Non-ch}$. By selecting a cluster-head $110_{ch}$, the non-cluster-head node $110_{Non-ch}$ also selects the cluster 112 to which it will belong for that round 130. It should be appreciated that although the cluster-head $110_{ch}$ with the strongest signal (relative to the selecting node 110) would typically be chosen by each non-cluster-head node $110_{Non-ch}$ other criteria such as environmental factors and geography can be used in selecting the cluster 112 to be joined for each round 130.

Once all the nodes 110 are organized into clusters 112, each of the cluster-heads $110_{chs}$ creates a schedule, step 530, for the nodes 110 in its cluster. This allows the radio components of each non-cluster-head node $110_{Non-ch}$ to be turned off at all times except during its transmit time, thus minimizing the energy dissipated in the individual nodes 110. Once the cluster-head $110_{ch}$ has all the data from the nodes 110 in its cluster 112, the cluster-head $110_{ch}$ aggregates the data and then transmits the aggregated data to the base station 102. Since the base station 102 can be located far away this could be a high energy transmission.

Since there are relatively few cluster-heads $110_{chs}$ compared with the total number of nodes 110, this only affects a small number (K) of nodes 110. As discussed above, being a cluster-head $110_{ch}$ drains that node's 110 battery more heavily. In order to spread this energy usage over multiple nodes 110, the cluster-heads $110_{chs}$ are not fixed; rather, this position is self-elected at different time intervals. Thus a set C of nodes 110 might elect themselves cluster-heads at time t1, but at time t1+d a new set C' of nodes elect themselves as cluster-heads.

In FIG. 1B, for example, nodes $110d_{ch}$, $110h_{ch}$ and $110m_{ch}$ are shown as cluster-heads for a particular transmission round. In a subsequent transmission round, however, nodes 110e, 110g and 110i can elect themselves as cluster-heads and nodes 110d, 110h and 110m are non-cluster-head nodes $110_{Non-chs}$.

Furthermore, the clusters themselves may include different nodes and a different number of clusters can be used for a given round of communications. For example, referring briefly to FIG. 1B, if node 110e is a cluster-head, cluster 112a' may be comprised of nodes 110b, 110d, 110I and 110r. Similarly, if node 110g is a cluster-head, then cluster 112b' may be comprised of nodes 110a, 110c, 110f, 110h and 110j.

While the distributed algorithm for determining cluster-heads $110_{chs}$ ensures that the expected number of clusters 100 per round is k (a configuration parameter), it does not guarantee that there are k clusters at each round. In addition, the set-up protocol does not guarantee that nodes are evenly distributed among the cluster-heads. Therefore, the number of nodes per cluster is highly variable in LEACH, and the amount of data each node can send to the cluster-head $110_{ch}$ varies depending on the number of nodes in the cluster. It is possible that a smaller cluster 112 can have more data transmission cycles in a round 130 than a larger cluster 112. The decision to become a cluster-head $110_{ch}$ depends at least in part on the amount of energy left at the node 110. In this way, nodes 110 with more energy remaining will perform the energy-intensive functions of the network 10.

With reference again to FIG. 4, once the nodes 110 have elected themselves at step 500 to be cluster-heads $110_{ch}$ using the probabilities in Equation 2 or 5, the cluster-heads $110_{chs}$ must let all the other nodes 110 in the network 10 know that they have chosen this role for the current round 130. To do this, each cluster-head $110_{ch}$ broadcasts an advertisement message (ADV) at step 510 preferably using a carrier-sense multiple access (CSMA) Media Access Control (MAC) protocol. It should be appreciated that other protocols may be used. This message is a small message containing an identified (ID) of each node 110 and a header that distinguishes this message as an announcement message. This message must be broadcast to reach all of the nodes 110 in the network 10. The reason for this is two-fold. First, ensuring that all nodes 110 receive the advertisement essentially eliminates collisions when carrier-sense is used, since there is no hidden terminal problem. Second, since there is no guarantee that the nodes 110 that elect themselves to be cluster-heads $110_{ch}$ are spread evenly throughout the network 10, using enough power to reach all nodes 110 ensures that every node 110 can become part of a cluster 100. If the power of the advertisement messages was reduced, some nodes 110 on the edge of the network may not receive any announcements and therefore may not be able to participate in this round 130 of the protocol. Since these advertisement messages are small, the increased power to reach all nodes 110 in the network 10 is not a burden.

If at step 510, no cluster-heads $110_{ch}$ are elected, the base station 102 can preferably communicate with the nodes 110 for the current round 130. Alternatively, the base station 102 can signal the nodes 110 to reform the clusters 112 by returning to step 500.

At step 540, each non-cluster-head node $110_{Non-ch}$ determines to which cluster it wants to belong by choosing the cluster-head $110_{ch}$ that requires the minimum communication energy, based on the received signal strength of the advertisement from each cluster-head $110_{ch}$. Assuming symmetric propagation channels for pure signal strength, the cluster-head 110 advertisement heard with the largest signal strength is the cluster-head $110_{ch}$ to whom the minimum amount of transmitted energy is needed for communication. This will typically be the cluster-head $110_{ch}$ closest to the sensor node 110. However, if there is some obstacle impeding the communication between two physically close nodes 110 (e.g., a building, a tree, etc.) such that communication with another cluster-head $110_{ch}$, located further away, is easier, the sensor will choose the cluster-head that is spatially further away but "closer" in a communication sense. In the case of ties (e.g., two cluster-heads require same amount of energy to reach a non-cluster-head node $110_{Non-ch}$) a random function is used to select the cluster-head $110_{ch}$ with which the node will communicate.

After each node 110 has decided to which cluster 112 it belongs, it must inform the cluster-head $110_{ch}$ of that cluster that it will be a member of that cluster. At step 550, each node 110 transmits a join-request message (Join-REQ) back to the chosen cluster-head $110_{ch}$ using CSMA. This message is again a short message, consisting of the ID of the node 110, the ID of the cluster-head $110_{ch}$, and a header. Since each nodes 110 has an indication of the relative power needed to reach the cluster-head $110_{ch}$ (based on the received power of the advertisement message), it could adjust its transmit power to this level. However, this approach suffers from the hidden-terminal problem; if a node 110 close to the cluster-head $110_{ch}$ is currently transmitting a join-request message using low-power, the remaining nodes 110 in the cluster 112 cannot sense that this transmission is occurring and may decide to transmit their own join-request messages. Since these messages are small, it is more energy-efficient to increase the transmit power of the join-request messages than to use an IEEE 802.11 protocol approach of transmitting request to send-clear to send (RTS-CTS) messages. Since the cluster-head $110_{ch}$ does not know the size of its cluster 112, it would need to transmit the CTS message using large power to reach all potential cluster member, nodes 110. In addition, simply increasing the transmit power reduces the latency and increases the sleep time allowed for all the nodes 110 compared with an RTS-CTS approach. Therefore, the nodes use a large amount of power for transmissions of the short join-request messages to the cluster-heads $110_{chs}$.

The cluster-heads $110_{chs}$ act as local control centers to coordinate the data transmissions in their respective clusters 112. In step 530, the cluster-head sets up a Time Division Multiple Access (TDMA) schedule and transmits this schedule to the nodes 110 in the cluster 112. This ensures that there are no collisions among data messages and also allows the radio components of each non-cluster-head node $110_{Non-ch}$ to be turned off at all times except during their transmit time, thus minimizing the energy dissipated by the individual sensors. After the TDMA schedule is known by all nodes 110 in the cluster 112, the set-up phase is complete and the steady-state operation (data transmission) can begin. It should be appreciated that other protocols such as Frequency Division Multiplexing may be used to collect data.

FIGS. 5A and 5B show dynamic cluster formation during two different rounds 130 of LEACH. All nodes 110 marked with a given symbol (e.g., circle, x, square, triangle, cross) belong to the same cluster 112 for a given round of operation, and the cluster-heads are designated as $110_{chs}$. A cluster 112 can contain a single node 110 acting as the cluster-head $110_{ch}$. The clusters 112 can vary in shape and size from one round 130 (r) to the next round 130 (r+1). The actual number of clusters 112 can vary from the expected number of clusters 112 in any given round.

Figure 6:
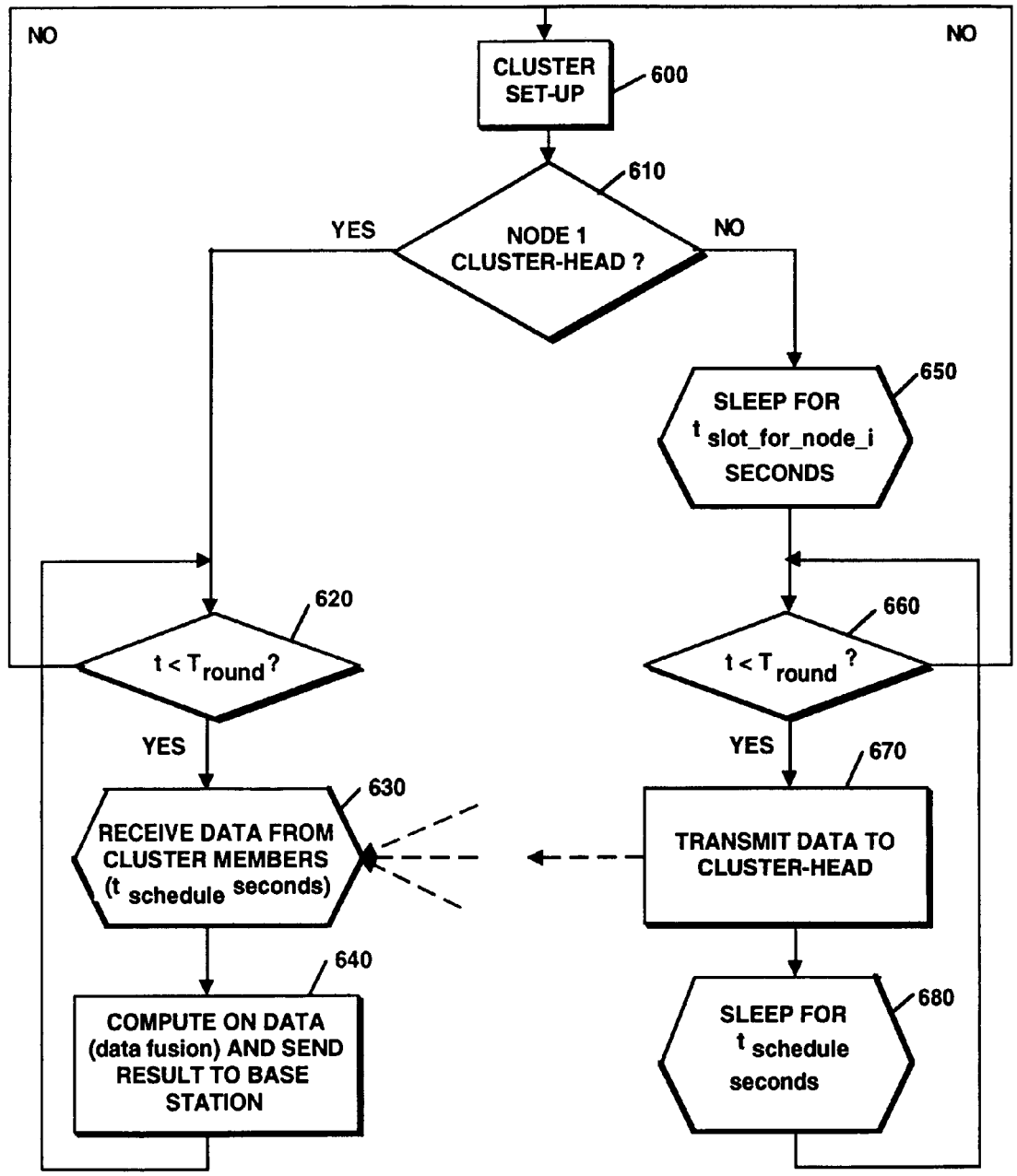
FIG. 6 is a flow diagram illustrating steady state operation of the low energy adaptive clustering network.

FIG. 6 illustrates the operational steps during the steady-state phase. After the cluster set-up step 600, the non-cluster-head nodes $110_{Non-chs}$ are determined in step 610 and these nodes 110 send their data to the cluster-head $110_{ch}$ at most once per frame 134 (shown in FIG. 3) during their allocated transmission time. This transmission uses an amount of energy determined from the received strength of the cluster-head $110_{ch}$ advertisement. In step 650, the radio of each non-cluster-head node $110_{Non-ch}$ is turned off until its allocated transmission time, thus reducing the energy dissipated in these nodes. Decision block 660 implements a loop in which steps 600–650 are repeated until enough time has elapsed for the round to end. The duration of a round 130 can be set as a parameter by the system administrator or can be controlled by the base station 102 as a function of the energy distribution in the nodes 110. Since all the nodes 110 usually have data to send to the cluster-head $110_{ch}$ and the total bandwidth is fixed, using a TDMA schedule is efficient use of bandwidth and represents a low-latency approach, in addition to being energy-efficient.

Once the decision is made in decision block 660 that the amount of time for this round has elapsed, then nodes 110 send their data during the scheduled time as shown in step 670 and then return to the sleep mode, step 680, until the next frame 134.

If in decision block 610, a decision is made that the node is the cluster-head, then processing flows to step 620. In decision block 620, if a decision is made that not enough time has elapsed, then processing returns to step 600 and steps 600–620 are repeated. If in decision block 620, a decision is made that sufficient time has elapsed for the round to end, then processing proceeds to step 630. The cluster-head $110_{ch}$ must keep its receiver on during the round to receive all the data from the nodes 110 in the cluster 112. As shown in step 630, after the cluster-head $110_{ch}$ receives all the data for a frame 134, it can operate on data step 640 (e.g., performing data aggregation, as discussed below) and then send the resultant data (or the original data) from the cluster-heads $110_{chs}$ to the base station 102. Since the base station 102 may be far away and the data message is large, this is a high-energy transmission.

Figure 7:
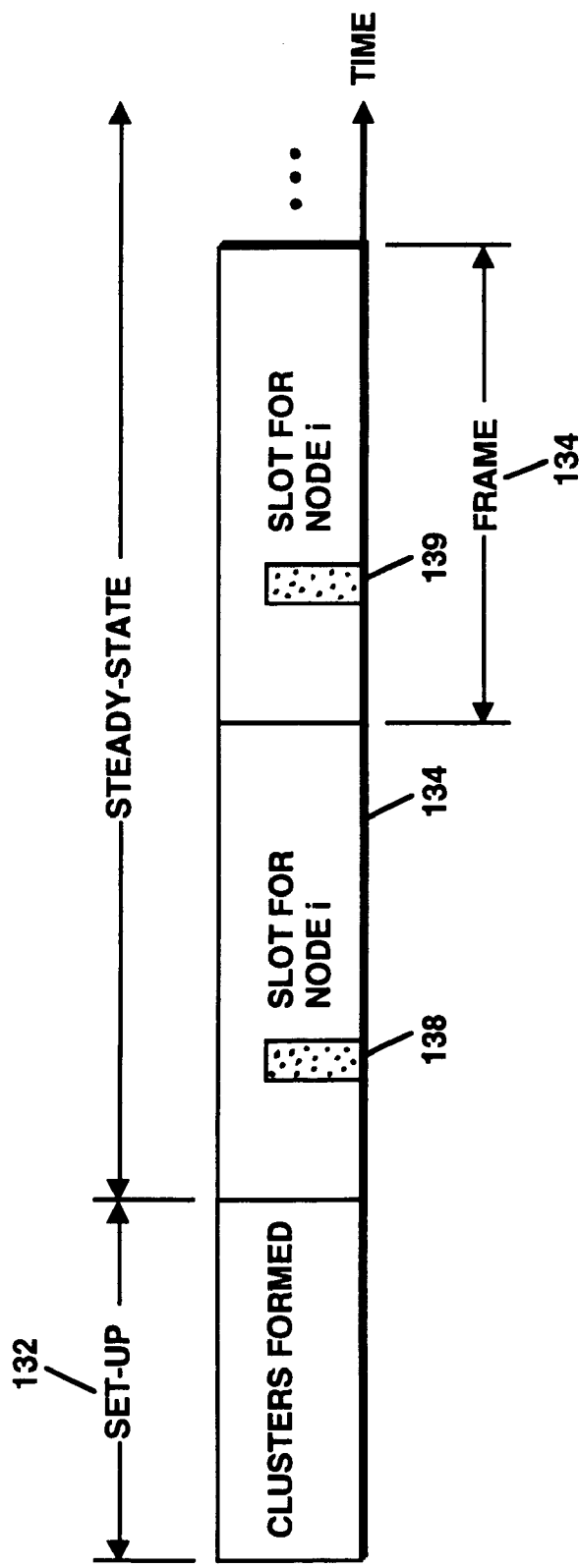
FIG. 7 is a timing diagram of data transmission according to the present invention.

FIG. 7 shows a time-line operation of network 100 operation. Data transmissions are explicitly scheduled to avoid collisions and increase the amount of time each non-cluster-head node 110$_{Non-ch}$ can remain in the sleep state.

The MAC and routing protocols ensure low-energy dissipation in the nodes 110 and no collisions of data messages within a cluster 100. However, radio is inherently a broadcast medium. As such, transmission in one cluster (e.g., cluster 112a in FIG. 5A) will affect (and often degrade) communication in a nearby cluster (e.g., cluster 112b in FIG. 5A). To reduce inter-cluster interference, each cluster 100 in LEACH communicates using a unique orthogonal spreading code, as in a CDMA network. Thus, when a node 110 decides to become a cluster-head 110$_{ch}$, it chooses randomly from a list of spreading codes. It informs all the nodes 110 in the cluster to transmit using this spreading code and filters all received energy using this spreading code. As in a cellular network, the interference comes from the nodes 110 in surrounding clusters 112. To reduce the possibility of interfering with nearby clusters 100 and reduce its own energy dissipation, each node 110 adjusts its transmit power to minimize interference. Therefore, little spreading of the data is actually needed to ensure a low probability of collision.

In a large sensor network 100, it would be difficult for an end-user to examine all the data from each sensor node 110 in the network. Therefore, each cluster-head can preferably utilize automated methods of combining or aggregating the data into a small set of meaningful information using techniques known in the art. In addition to helping avoid information overload, data aggregation, or data fusion, can combine several unreliable data measurements to produce a more accurate signal by enhancing the common signal and reducing the uncorrelated noise. One method of aggregating data is beamforming. Beamforming combines signals from multiple sensor nodes 110 in order to satisfy an optimization criteria, such as minimizing mean squared error (MSE) or maximizing signal-to-noise ratio (SNR). Various algorithms such as the least mean squared (LMS) error approach and the maximum power beamforming algorithm have been developed to beamform signals. These algorithms have various energy and quality tradeoffs. For example, the maximum power beamforming algorithm is capable of performing blind beamforming, requiring no information about the sensor node 110 locations. However, this algorithm is compute-intensive, which will quickly drain the limited energy of the node.

Data aggregation can be performed at the cluster-heads 110$_{chs}$ in network 100. If the energy for communication is greater than the energy for computation, performing the data aggregation algorithm locally at the cluster-head 110$_{ch}$ can greatly reduce the overall system energy, since much less data needs to be transmitted to the base station 102. This will allow large computation versus communication energy gains with little to no loss in overall network quality.

In order for the cluster-heads 110$_{chs}$ to perform data aggregation to compress the data into a single signal, data from the different nodes 110 in the cluster must be correlated. Because it is difficult to determine exact correlation, a data-independent model determines the amount of correlation that exists between the data from different sensor nodes 110. The model is based on the assumption that the source signal travels a distance before it can no longer be reliably detected by the sensors 126, and that the sensors 126 are omnidirectional (e.g., acoustic, seismic sensors).

Figure 8A:
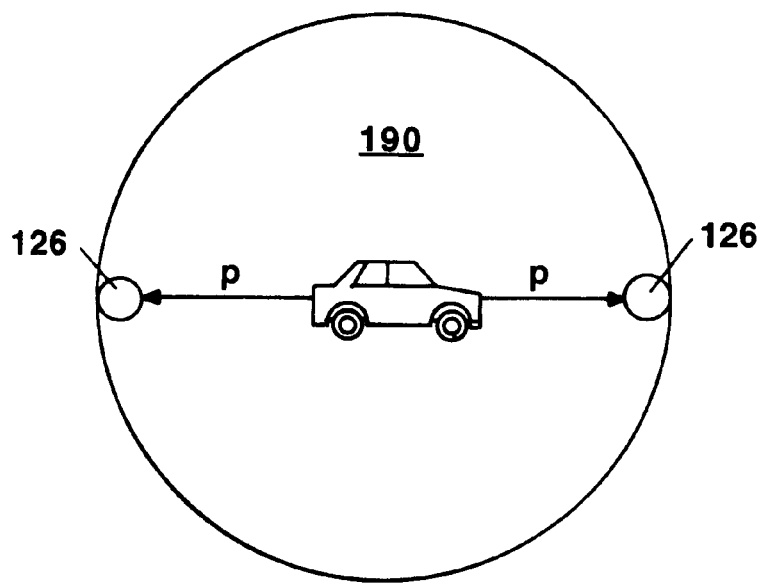
FIGS. 8A, 8B, and 8C are diagrams of the correlation among data sensed by nodes according to the present invention.
Figure 8B:
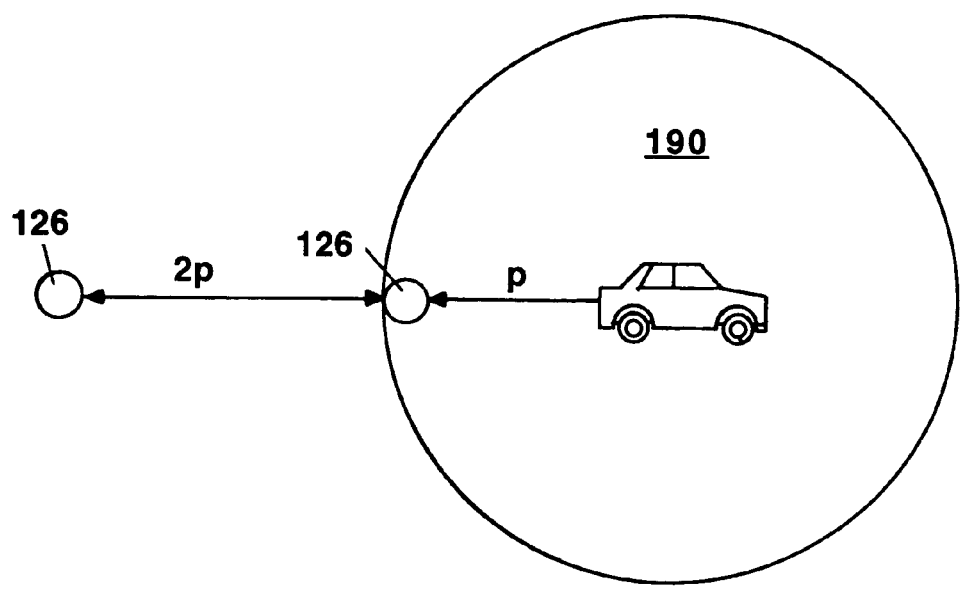

Now referring to FIG. 8A, this implies that the maximum distance between sensors 126 with correlated data is 2ρ covering area 190. However, being within 2ρ of each other does not guarantee that the two sensors 126 will detect the same signal as shown in FIG. 8B.

Figure 8C:
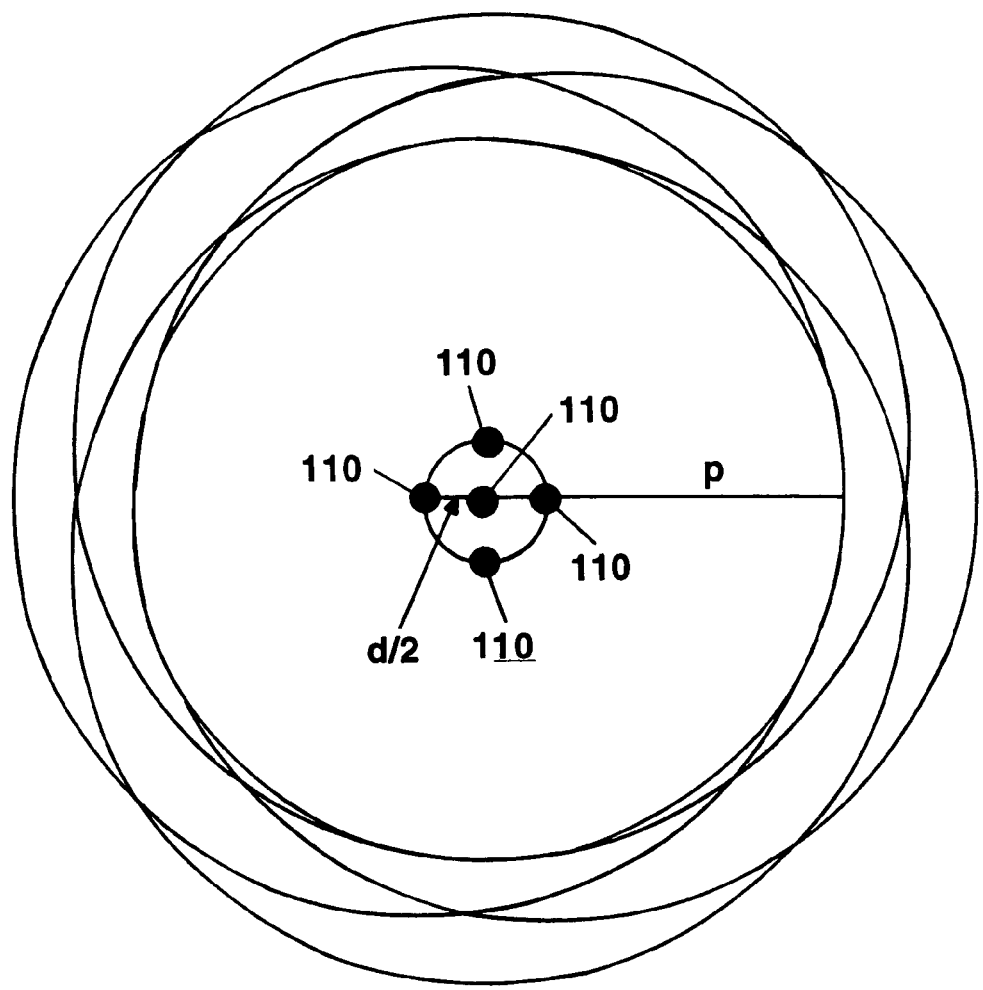

FIG. 8C shows the minimum amount of overlap when all nodes 110 in a cluster are separated by at most distance d and their view of the world has a radius ρ. From FIG. 8C, it is seen that the total amount of overlap, O, in the nodes' 110 view of source signals is at least:

$$O \geq \pi\left(\rho - \frac{d}{2}\right)^2 \qquad \text{(Equation 11)}$$

Therefore, the fraction of overlap $f$ is $$f \geq \frac{\pi\left(\rho - \frac{d}{2}\right)^2}{\pi\rho^2} \qquad \text{(Equation 12)}$$

If d is written as a fraction x of ρ, d=xρ, then the amount of overlap simplifies to $$f \geq \left(1 - \frac{x}{2}\right)^2 \qquad \text{(Equation 13)}$$

If the system requires that there be over 50% overlap, this means that the maximum distance between nodes in the cluster is:

$$\left(1 - \frac{x}{2}\right)^2 > 0.5 \qquad \text{(Equation 14)}$$

$$x < 2\left(1 - \frac{1}{\sqrt{2}}\right)$$

$$x < 0.5858$$

or d<0.6ρ.

Referring to FIG. 8C, to ensure at least 50% overlap in the data to employ the local data aggregation scheme discussed above, the maximum distance between any two nodes whose signals are beamformed must be approximately 0.6ρ. If the maximum distance is greater than 0.6ρ, the cluster-head must perform separate data aggregations to ensure high quality signals.

In an alternate embodiment of the cluster formation process, when clusters 100 need to be formed (e.g., at the beginning of each round 130), each node 110 sends some information to base station 102 and base station 102 executes an optimization algorithm to determine the optimal clusters 112 for that round 130. The clusters 112 formed by the base station 102 will in general be better than those formed using the distributed algorithm described above. However, this approach requires that each node 110 transmit information to the base station 102 at the beginning of each round 130 about its location. This may be achieved by using a GPS receiver (not shown) that is activated at the beginning of each round 130 to get the current location of each node 110. In addition, each node 110 must send its current energy level to the base station 102.

In this base station cluster formation process, the base station 102 computes the average node 110 energy, and whichever nodes 110 have energy below this average cannot be a cluster-head for the current round 130. Using the remaining nodes 110 as possible cluster-heads 110$_{chs}$, the base station 102 performs a simulated annealing algorithm as is known in the art, to determine the best k nodes 110 to be cluster-heads 110$_{chs}$ for the next round 130 and the associated clusters 100. This approach minimizes the amount of energy the non-cluster-head nodes 110$_{Non\text{-}chs}$ will have to use to transmit their data to the cluster-head 110$_{ch}$, by minimizing the total sum of squared distances between all the non-cluster-head nodes 110$_{Non\text{-}chs}$ and the closest cluster-head 110$_{ch}$.

In one embodiment, the base station 102 can use the simulated annealing algorithm, given the current optimum set of cluster-heads 110, C, a new set of cluster-heads 110' C' will become optimal at iteration k with probability $$p_k = \begin{cases} e^{-(f(C')-f(C))/(1000e^{-k/20})} & : f(C') \geq f(C) \\ & : f(C') < f(C) \end{cases} \quad \text{(Equation 15)}$$

where $f(C)$ represents the cost function defined by $$f(C) = \sum_{i=1}^{N} \min_{c \in C} d^2(i, c) \quad \text{(Equation 16)}$$

where d(i,c) is the distance between node 110$i$ and node 110$c$. In this case the nodes 110 having above average energy are more likely to become cluster heads 110$_{chs}$. This algorithm typically converges in 200–500 iterations for a network which includes one hundred nodes 110. Since these computations are being performed at the base station 102, energy dissipation is not a concern. It should be appreciated that other algorithms which minimize the cost function $f(C)$ can be used for cluster allocation.

Once the optimal cluster-heads 110$_{chs}$ and associated clusters 112 are found, the base station 102 transmits this information back to all of the nodes 110 in the network. This is done by broadcasting a message that contains the cluster-head ID for each node 110. If a node's cluster-head ID matches it's own ID, that node 110 takes on the cluster-head 110$_{ch}$ role; otherwise, the node 110 determines its TDMA slot for data transmission and goes to sleep until it is time to transmit data to its cluster-head 110A$_{ch}$. The steady-state phase in this approach is identical to that shown in FIG. 5.

In another alternate embodiment, an "event-driven" protocol is implemented so that sensors nodes 110 only transmit data if some event occurs in the environment thereby further reducing the amount of data transferred to the cluster-head 110$_{chs}$ and to the base station 102.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method of forming a network from a plurality of nodes and a base station, the method comprising the steps of:
    (a) identifying at least one node of the plurality of nodes to operate as a cluster-head including randomly selecting one of the plurality of nodes to be a cluster-head;
    (b) forming a plurality of clusters from the plurality of nodes, each of the clusters having at least one cluster-head;
    (c) transmitting data from at least one node in at least one of the plurality of clusters to the cluster-head in that cluster;
    (d) transmitting data from at least one cluster-head to the base station; and
    (e) identifying a different one of the plurality of nodes to operate as a cluster-head; wherein the step of randomly selecting one of the plurality of nodes to be a cluster-head is based on a probabilistic function of an amount of energy remaining in each of the plurality of nodes.

2. The method of claim 1, wherein the step of forming a plurality of clusters further comprises the steps of:
    advertising an availability of each of said plurality of cluster-heads; and
    establishing a communication path between each of said plurality of cluster-heads and at least one of the plurality of nodes, not operating as a cluster-head, to form a cluster.

3. The method of claim 2 wherein the step of establishing a communication path between the cluster-head and each of the at least one of the plurality of nodes comprises the steps of:
    transmitting a status signal from each one of said plurality of cluster-heads;
    receiving at each of the plurality of nodes one or more of the status signals;
    comparing, at each of the plurality of nodes, not operating as a cluster-head, signal strengths of the received one or more status signals; and
    joining a particular one of the cluster-head's cluster as a result of the comparison.

4. The method of claim 3, wherein the step of joining a particular cluster is based on a determination, by at least one of the plurality of nodes, of the cluster-head transmitting the status signal having a highest received signal strength.

5. The method of claim 2 further comprising the steps of:
    generating at the cluster-head, a schedule having allotted slots for transmission;
    transmitting data from at least one node to the cluster-head during the allotted slots;
    receiving data in the cluster-head that are transmitted from at least one node; and
    transmitting data from the cluster-head to the base station.

6. The method of claim 5, wherein the step of receiving data in the cluster-head further comprises the step of reducing data transmission latency by using application-specific data aggregation to reduce the amount of redundant data sent to the base station.

7. The method of claim 5, wherein the step of receiving data in the cluster-head further comprises the step of increasing the signal to noise ratio of the data sent to the base station by using application-specific data aggregation.

8. The method of claim 5, wherein the step of generating a schedule uses a time division multiplexing protocol.

9. The method of claim 5, further comprising the step of beamforming the data received from the plurality of nodes in the cluster.

10. The method of claim 1, wherein the step of forming a plurality of clusters further comprises the steps of:
   collecting data on a status of each of the plurality of nodes;
   assigning each of the plurality of nodes to a particular one of a plurality of clusters.

11. A method for forming a network from a base station and a plurality of nodes, the method comprising the steps of:
   electing a cluster-head from the plurality of nodes;
   establishing a communication path between first ones of the plurality of nodes and the cluster-head to form a cluster;
   establishing a first round of data transmission;
   transmitting from the first ones of the plurality of nodes to the cluster-head during the first data transmission round; and
   transmitting data from the cluster-head to the base station during the first data transmission round;
   establishing a second round of data transmission;
   determining whether each node of the plurality of nodes has operated as a cluster-head;
   electing a second set of cluster-heads wherein each node in the second set of cluster-heads has never before been a cluster-head;
   forming a second set of clusters about the second set of cluster-heads;
   electing a plurality of cluster-heads corresponding to a first set of cluster-heads for use during the first round of data transmission; and
   establishing a communication path between each of the plurality of cluster-heads and at least one node of the plurality of nodes to form a first plurality of clusters.

12. The method of claim 11 wherein the step of electing a plurality of cluster-heads is performed by the base station.

13. The method of claim 12 wherein the base station elects cluster-heads by minimizing an energy required during the first round of data transmission.

14. The method of claim 11 wherein:
   during the first round of data transmission, each of the at least one node in each cluster transmits data to the cluster-head of that cluster; and
   each cluster-head transmits data to the base station during the first transmission round.

15. The method of claim 11 further comprising the steps of:
   in each of a second set of clusters;
   transmitting data from each node in the second set of clusters to the respective cluster heads; and
   transmitting data from each of the second set of cluster-heads to the base station.

16. A method for forming a network from a base station and a plurality of nodes, the method comprising the steps of:
   electing a cluster-head from the plurality of nodes;
   establishing a communication path between first ones of the plurality of nodes and the cluster-head to form a cluster;
   establishing a first round of data transmission;
   transmitting from the first ones of the plurality of nodes to the cluster-head during the first data transmission round;
   transmitting data from the cluster-head to the base station during the first data transmission round;
   establishing a second round of data transmission;
   determining an amount of energy remaining in each node of the plurality of nodes;
   electing a second set of cluster-heads, wherein the election is based on the amount of energy remaining in each node of the plurality of nodes;
   forming a second set of clusters about the second set of cluster-heads;
   electing a plurality of cluster-heads corresponding to a first set of cluster-heads for use during the first round of data transmission; and
   establishing a communication path between each of the plurality of cluster-heads and at least one node of the plurality of nodes to form a first plurality of clusters.

17. A network comprising:
   a base station; and
   a plurality of nodes comprising:
      a cluster-head selector processor; and
      a cluster selector processor, each cluster comprised of a subset of said plurality of nodes, and one of each of said subset of said plurality of nodes temporarily acting as a cluster-head, wherein each of said plurality of nodes has a limited amount of remaining energy; and
   wherein the cluster-head selector processor selects each of said plurality of nodes as a cluster-head based on the limited amount of remaining energy in each of said plurality of nodes and a number of times each of said plurality of nodes has operated as a cluster head.

18. The network according to claim 17, wherein each of the plurality of nodes is in electrical communication with a sensor.

19. The network according to claim 17, wherein each of said plurality of nodes further comprises a sleep mode.

20. The network according to claim 17, wherein each of said plurality of nodes further comprises an adjustable transmission energy level.

21. The network according to claim 17, wherein each of said plurality of nodes further comprises a low energy mode, and a high energy mode.

22. The network according to claim 17, wherein each of said plurality of nodes further comprises a signal strength processor.

23. The network according to claim 22, wherein the cluster selector processor determines the cluster selection in response to a signal from the signal strength processor.

24. The network according to claim 17, wherein the base station selects each of said plurality of nodes to temporarily act as a cluster-head.

25. The network according to claim 17, wherein the base station determines which of each of said plurality of nodes is included in each temporary cluster.

* * * * *

UNITED STATES PATENT AND TRADEMARK OFFICE
CERTIFICATE OF CORRECTION

PATENT NO. : 7,035,240 B1 Page 1 of 1
APPLICATION NO. : 09/749332
DATED : April 25, 2006
INVENTOR(S) : Balakrishnan et al.

It is certified that error appears in the above-identified patent and that said Letters Patent is hereby corrected as shown below:

Column 5, line 7 delete "know in the art." and replace with --known in the art.--.

Column 9, line 65-66 delete "nodes10" and replace with --nodes 110--.

Column 13, line 50 delete "each nodes 110" and replace with --each node 110--.

Column 16, line 19 delete "overlap $f$ is" and replace with --overlap $f$ is:--.

Column 16, line 26 delete "simplifies to" and replace with --simplifies to:--.

Column 17, line 54 delete "sensors nodes 110" and replace with --sensor nodes 110--.

Signed and Sealed this

First Day of April, 2008

JON W. DUDAS
*Director of the United States Patent and Trademark Office*